UNITED STATES PATENT OFFICE 2,076,648

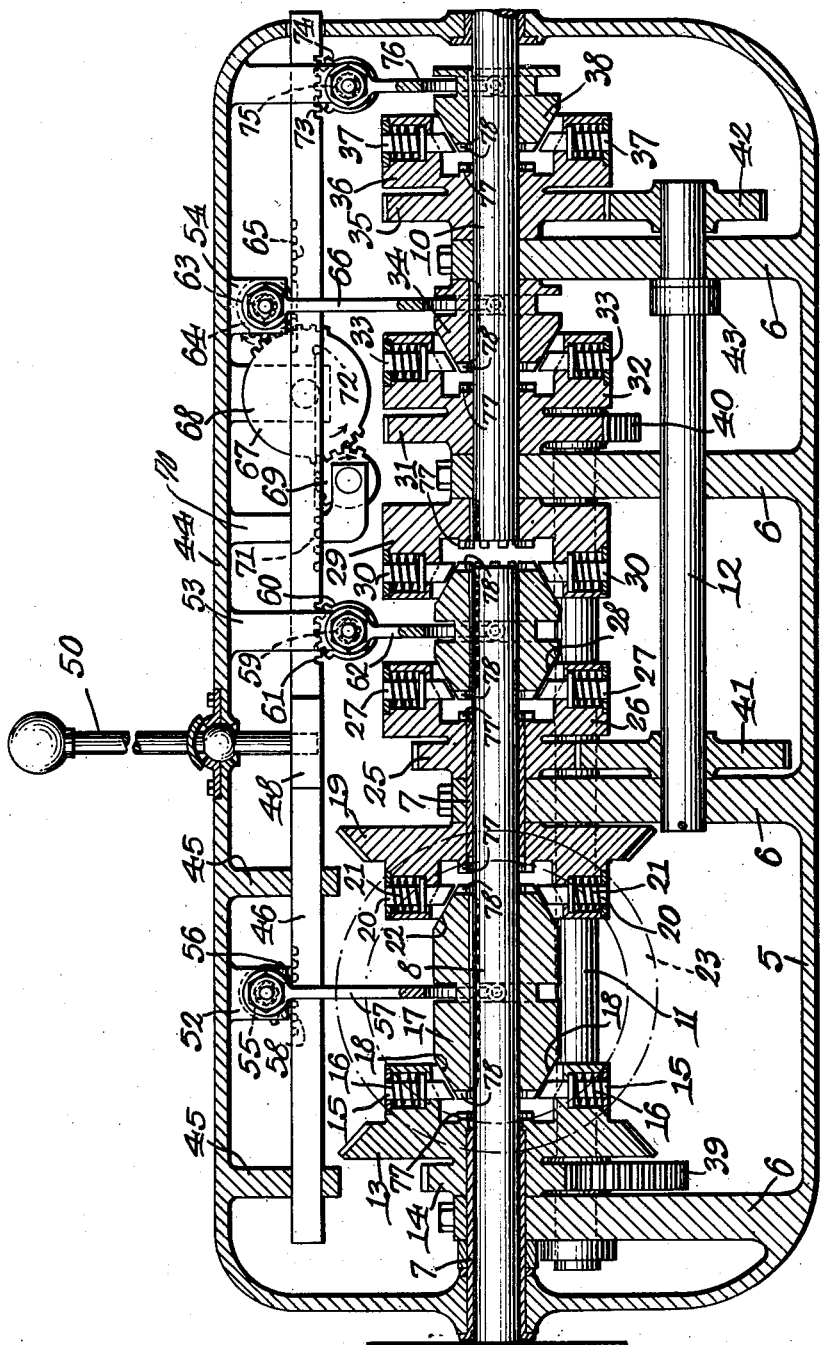

CLUTCH MECHANISM

Edward D. Jones, Clinton, Iowa, assignor of one-half to Ernest C. Jones, Clinton, Iowa Application October 24, 1932, Serial No. 639,357

1 Claim. (Cl. 192—53)

This invention relates to a clutch mechanism designed primarily for use in connection with motor vehicles, the primary object of the invention being to provide a device of this character whereby the operation of the usual gear shift lever, will operate to clutch the gears of the transmission to their shafts, thereby eliminating the use of the usual clutch, and foot pedal.

Another object of the invention is the provision of a clutch member associated with each gear of the transmission, the clutch members being of the cone type, and so constructed that the gears will be gradually moved into operation.

With the foregoing and other objects in view, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

The figure is a longitudinal sectional view through a transmission constructed in accordance with the invention.

Referring to the drawing in detail, the device comprises a gear housing indicated generally by the reference character 5, the gear housing being provided with bearing supports 6, in which the bearings 7 are mounted.

Mounted in certain of these bearings, is the drive shaft 8, which is formed with a flange 9 at its forward end, which flange has openings to accommodate bolts, whereby the flange may be secured directly to the fly wheel of the motor, not shown, to the end that the drive shaft rotates continuously, while the engine or motor is in operation.

Extending into the opposite end of the gear housing 5, is a shaft 10 which constitutes the driven shaft of the vehicle, and to which power is applied, from the drive shaft 8.

This shaft 10 is mounted in suitable bearings formed in the bearing supports 6, at the rear end of the housing 5. The shaft 11 is also supported in bearings formed in certain of the bearing supports 6, and is disposed in parallel spaced relation with the drive shaft 8, while another shaft indicated by the reference character 12 is also supported within the housing, and operates in bearings formed in certain of the bearing supports.

Mounted on the shaft 8, near one end thereof, is a bevelled gear 13 and a gear 14, the gear 14 being formed integral with the gear 13, so that the gears 13 and 14 move simultaneously. As clearly shown by the figure of the drawing, the gear 13 is much larger than the gear 14.

The inner surface of the bevelled gear 13 is provided with openings for the reception of the pins 15, which are spring pressed, and held to the limits of their inward movements, by means of the springs 16.

Splined on the shaft 8, is a clutch member 17, which is formed with inclined end surfaces 18 that are adapted to engage the inclined inner ends of the pins 15, thereby clutching the gears 13 and 14, which normally are loosely mounted on the shaft 8.

Associated with the opposite end of the clutch member 17 is a gear 19, which is of a diameter equal to the diameter of the gear 13, the gear 19 being also provided with pockets for the reception of the pins 20 that are held inwardly, by means of the springs 21. The bevelled end 22 of the clutch member 17, cooperates with these pins 20, in locking the gear 19 to the shaft 8. These gears 13 and 19 are constantly in mesh with the gear 23 that is mounted on a shaft, which in turn is disposed in a suitable bearing opening, formed in one wall of the gear housing.

The reference character 25 designates a gear that is loosely mounted on the inner end of the shaft 8, the gear being provided with an enlarged portion 26 which is provided with spring pressed pins 27, that cooperate with the clutch member 28 which is splined on the inner end of the drive shaft 8.

Secured to the inner end of the shaft 10, is a clutch member 29 that is formed with pockets to receive the spring pressed pins 30, the clutch member 28 being movable into engagement with the pins 30, in clutching the shafts 8 and 10 together. Loosely mounted on the shaft 10 is a gear 31, which is provided with an enlargement 32 that supports the spring pressed pins 33, which pins engage the bevelled inner side of the clutch member 34, which is also splined on the shaft 10.

The reference character 35 designates a gear which is loosely mounted on the shaft 10 at a point near the rear end of the housing 5, the gear 35 being provided with an enlargement 36 which supports the spring pressed pins 37 that contact with the bevelled inner side of the clutch member 38 splined on the shaft 10, thereby clutching the gear 35 to the shaft 10.

Supported at the forward end of the shaft 11, is a gear 39 that meshes with the gear 14, to the end that when the gear 14 is clutched to the shaft 8, movement of the shaft 8 will be transmitted to the gear 39 and shaft 11.

Keyed on the inner end of the shaft 11, is a gear 40 which is in mesh with the gear 31 at all times.

Meshing with the gear 25, is a gear 41 that is secured to the shaft 12, to rotate therewith. At the opposite end of the shaft 12 is a gear 42 that rotates with the shaft 12. This gear is in constant mesh with the gear 35. A collar indicated by the reference character 43 is mounted on the shaft 12, and engages one of the bearing supports 6, to hold the shaft 12 against movement longitudinally of the housing 5.

Within the housing 5, and depending from the cover 44 thereof, are arms 45, which provide supports for the actuating bars 46, that are slidably mounted in parallel relation with respect to each other.

These bars 46 (only one of which is visible on the drawing) are formed with offset portions 48 that register, when the bars are in their neutral positions, thereby providing an opening into which the inner end of the gear shift lever 50 extends, the offset portions 48 providing shoulders to be engaged by the lever 50 moving the bars 46, when the inner end of the lever 50 moves within the opening. Depending from the cover plate 44, are lugs 52, 53 and 54 respectively, the lugs 52 providing a support for the shaft 55 on which the mutilated gear 56 is secured.

This shaft 55 provides a support for the arm 57, that extends downwardly and connects with the clutch member 17, to operate the clutch member 17. The bar 46 (not shown on the drawing) is provided with teeth 58 that mesh with the mutilated gear 56, so that movement of the bar, will rotate the gear 56, which in turn rotates the shaft 55, moving the arm 57, operating the clutch member 17.

The lug 53 provides a support for the shaft 59 on which the mutilated gear 60 is secured, the mutilated gear 60 meshing with the teeth 61 formed in the lower surface of the bar 46.

The actuating arm 62 is secured to the shaft 59, and engages the clutch member 28, transmitting movement of the shaft 59 to the clutch member 28.

The lug 54 provides a support for the shaft 63, on which the mutilated gear 64 is secured, the gear 64 meshing with the teeth 65 of the bar 46 (not shown). Arm 66 extends downwardly from the shaft 63, and engages the clutch member 34, transmitting movement to the clutch member 34.

The gear 64 also meshes with the mutilated gear 67, that is mounted on the arm 68 that also depends from the cover. This gear 67 meshes with the mutilated gear 69 supported in the lower end of the arm 70, which gear 69 meshes with the teeth 71 formed in the lower surface of the rear bar 46. The rear bar 46 is provided with a cut out portion extending from the teeth 71, to the shoulder 72, with the result that the rear bar 46 may move in one direction, without operating the gear 69.

Teeth 73 are formed in the lower surface of the bar 46 shown on the drawing, and mesh with the teeth of the mutilated gear 74, that is mounted on the shaft 75. The arm 76 is also mounted on the shaft 75, and extends downwardly, where it has connection with the clutch member 38 to move the clutch member 38, when the bar 46 is moved in one direction.

Teeth 77 are formed on the inner surfaces of the gears 13, 19, 25, 29, 31 and 35, which teeth cooperate with teeth 78 formed at the ends of the clutch members which are splined on their supporting shafts. It will thus be seen that when the clutch members are moved along their supporting shafts, they will contact with the pins of the clutch members of the gears, causing the gears to rotate prior to the engagement of the teeth of the gears and clutch members, which locks the gears to the shafts.

It will of course be understood that the gears of the transmission are of such construction that the usual low, intermediate, high and reverse speeds may be had, by shifting the gears in a manner as described.

I claim:

In a clutch for clutching a drive shaft and a driven shaft together, an outer clutch member secured to the driven shaft, said clutch member having a recessed face formed with a tapered wall, teeth extending from the inner end of the recess and disposed in parallel relation with the axes of the shafts, a plurality of spring pressed pins extending inwardly through the wall of the recess at right angles to the axes of the shafts, and having beveled inner ends, an inner clutch member splined on the drive shaft and having a beveled end portion adapted to move into the recess of the first mentioned clutch member, the beveled inner ends of the spring pressed pins engaging the inner clutch member, frictionally clutching the shafts together, and teeth at the inner end of the inner clutch member and adapted to engage the teeth of the outer clutch member, positively clutching the shafts together, and means for operating the clutch.

EDWARD D. JONES.